(12) United States Patent
Lynggaard

(10) Patent No.: US 7,753,283 B2
(45) Date of Patent: Jul. 13, 2010

(54) ON-DEMAND PRINTING OF CODING PATTERNS

(75) Inventor: Stefan Lynggaard, Lund (SE)

(73) Assignee: Anoto Aktiebolag (Anoto AB) (SE)

( * ) Notice: Subject to any disclaimer, the term of this patent is extended or adjusted under 35 U.S.C. 154(b) by 1187 days.

(21) Appl. No.: 10/560,231

(22) PCT Filed: Jun. 11, 2004

(86) PCT No.: PCT/SE2004/000906
§ 371 (c)(1),
(2), (4) Date: Dec. 12, 2005

(87) PCT Pub. No.: WO2005/001754
PCT Pub. Date: Jan. 6, 2005

(65) Prior Publication Data
US 2006/0133877 A1      Jun. 22, 2006

Related U.S. Application Data

(60) Provisional application No. 60/477,926, filed on Jun. 13, 2003.

(30) Foreign Application Priority Data
Jun. 13, 2003    (SE) .................................... 0301729

(51) Int. Cl.
*G06K 19/05* (2006.01)
(52) U.S. Cl. ...................................... 235/494; 235/436
(58) Field of Classification Search ................. 235/494, 235/382, 436, 375
See application file for complete search history.

(56) References Cited

U.S. PATENT DOCUMENTS

| 5,221,833 A | 6/1993 | Hecht |
| 5,245,165 A | 9/1993 | Zhang |
| 5,449,896 A | 9/1995 | Hecht et al. |

(Continued)

FOREIGN PATENT DOCUMENTS

DE    101 18 304 A1    10/2002

(Continued)

OTHER PUBLICATIONS

Office Action mailed Nov. 28, 2008, in co-pending U.S. Appl. No. 10/558,062 (15 pages).

(Continued)

*Primary Examiner*—Daniel St.Cyr
(74) *Attorney, Agent, or Firm*—Finnegan, Henderson, Farabow, Garrett & Dunner LLP (57) ABSTRACT

A computer-implemented method is designed for on-demand printing on digital printers of a coding pattern to code data on a surface. The coding pattern comprises a plurality of parallel number sequences which represent different rotations of a cyclic number sequence. The method could involve retrieving a digital representation of the coding pattern, and identifying the rotations therein to derive shift information which designates a phase difference between each rotation and the cyclic number sequence. In the printing operation, all the different rotations may be represented by the cyclic number sequence embodied as at least one code block image. This code block image is repeated in accordance with the shift information to form a printable image in the printer.

37 Claims, 8 Drawing Sheets

U.S. PATENT DOCUMENTS

| | | | |
|---|---|---|---|
| 5,477,012 A | 12/1995 | Sekendur | |
| 5,862,255 A | 1/1999 | Davies et al. | |
| 6,000,613 A | 12/1999 | Hecht et al. | |
| 6,000,621 A | 12/1999 | Hecht et al. | |
| 6,208,771 B1 | 3/2001 | Jared et al. | |
| 6,330,976 B1 | 12/2001 | Dymetman et al. | |
| 6,548,768 B1* | 4/2003 | Pettersson et al. | 178/18.01 |
| 6,732,927 B2* | 5/2004 | Olsson et al. | 235/454 |
| 7,143,952 B2* | 12/2006 | Ericson | 235/494 |
| 7,191,392 B1 | 3/2007 | Coar | |
| 2003/0012455 A1* | 1/2003 | Olsson et al. | 382/286 |
| 2003/0056169 A1 | 3/2003 | Lapstun et al. | |
| 2003/0066896 A1 | 4/2003 | Pettersson et al. | |
| 2003/0085884 A1* | 5/2003 | Pettersson et al. | 345/179 |
| 2003/0174135 A1 | 9/2003 | Gyllenskog et al. | |

FOREIGN PATENT DOCUMENTS

| | | |
|---|---|---|
| EP | 1186991 A2 | 3/2002 |
| WO | WO-92/17859 A1 | 10/1992 |
| WO | WO-00/73983 | 12/2000 |
| WO | WO-01/71643 A1 | 3/2001 |
| WO | WO-01/26032 A1 | 4/2001 |
| WO | WO-01/71653 A1 | 9/2001 |
| WO | WO-01/75779 A1 | 10/2001 |
| WO | WO 01/75773 A1 | 11/2001 |
| WO | WO-02/082366 A1 | 10/2002 |
| WO | WO-02/084473 A1 | 10/2002 |
| WO | WO-03/001440 A1 | 1/2003 |
| WO | WO-03/003288 A1 | 1/2003 |
| WO | WO-2004/104818 A1 | 12/2004 |

OTHER PUBLICATIONS

Office Action mailed Jun. 19, 2009, in co-pending U.S. Appl. No. 10/558,062 (19 pages).

Notice of Allowability mailed on Nov. 2, 2009, in co-pending U.S. Appl. No. 10/558,062 (4 pages).

Adams, Russ. Plessey Bar Code Specification Page. Copyright 1995. (4 pages) http://www.adams1.com/plessy.html. Accessed Jun. 10, 2009.

International Search Report mailed Sep. 17, 2004 in PCT/SE/2004/000906 (3 pages).

International Search Report mailed Jul. 14, 2004 in PCT/SE/2004/000805 (2 pages).

* cited by examiner

| Value | Displacement | Pair of bits |
|---|---|---|
| 0 | Upwards | 0,0 |
| 1 | Right | 0,1 |
| 2 | Left | 1,0 |
| 3 | Downwards | 1,1 |

FIG. 4B x-dimension       y-dimension

ON-DEMAND PRINTING OF CODING PATTERNS

CROSS-REFERENCE TO RELATED APPLICATIONS

The present application claims the benefit of Swedish patent application No. 0301729-0, filed on Jun. 13, 2003, and U.S. Provisional patent application No. 60/477,926, filed on, Jun. 13, 2003, which both are hereby incorporated by reference.

FIELD OF THE INVENTION

The present invention generally relates to printing of coding patterns on on-demand digital printers.

BACKGROUND ART

It is known to use a coding pattern to embed some type of information in a passive base such as a sheet of paper, a writing board or equivalent. A suitably programmed scanner, fax machine, camera or digital pen can then read, recreate and use the information embedded locally in the base. For example, graphical information on a base can be supplemented with embedded information which extends the functionality of the base. Such embedded information can comprise file data for full or partial recreation of the graphical information, commands, supplementary text or images, hyperlinks, absolute positions, etc.

Coding patterns are generally constructed around some form of machine-readable code symbols which are regularly spaced on the base. One specific class of coding patterns are based on one or more cyclic number sequences, also called pseudo-random sequences. As is known, such a cyclic number sequence is the ordered set of unique n-bit long subsequences that an n-stage shift register generates when it is preloaded with a given seed value and operated with feedback taps at specified register locations. Thus, such a cyclic number sequence has the property that the place in the number sequence of each subsequence of a predetermined length (n) is unambiguously determined. According to various principles, data may encoded on the base by printing such a cyclic number sequence, in the form of a sequence of graphical symbols, over the base surface with various rotations or circular shifts. Different encoding principles are described, i.a., in WO 92/17859; WO 00/73983; WO 01/26032; WO 01/71643; WO 02/084473; WO 03/001440; U.S. Pat. No. 6,000,621; and U.S. Pat. No. 6,208,771.

In many cases, bases with a coding pattern can be generated on a large scale and with high precision in the graphics industry. There are, however, also occasions when it is desirable to create bases with a coding pattern on a small scale, for example by using a personal computer, to which a printer of, for example, the ink-jet or laser type, has been connected.

This can be carried out in such a way that the required coding pattern is created as an image file in a graphical format, for example, in bitmap format. This image file is converted by the computer into a page-describing and normally printer-independent code, such as PostScript (trademark), after which it is transmitted to the printer unit. On the basis of the page-describing code, the printer unit creates corresponding instructions for control of the printer's hardware. This hardware can, in the case of a laser printer, comprise a laser diode with associated optics. In an ink-jet printer, the hardware may comprise an ink ejector arrangement. The printing is then carried out on a base, for example a sheet of paper.

If the coding pattern has a high information density, which can be achieved by dense arrangement of the code symbols on the base, the image file and the page-describing code may become large. Consequently, transfer times and printer processing times for such code may become excessive.

SUMMARY OF THE INVENTION

An object of the present invention thus is to provide a printing technique that overcomes the above problems.

These and other objects that will be evident from the following description are now achieved wholly or partly by methods and apparatus according to the independent claims. Preferred embodiments are defined in the dependent claims.

BRIEF DESCRIPTION OF THE DRAWINGS

The invention will now be described by way of example with reference to the accompanying drawings, which schematically illustrate currently preferred embodiments.

DETAILED DESCRIPTION OF THE INVENTION

Figure 1:
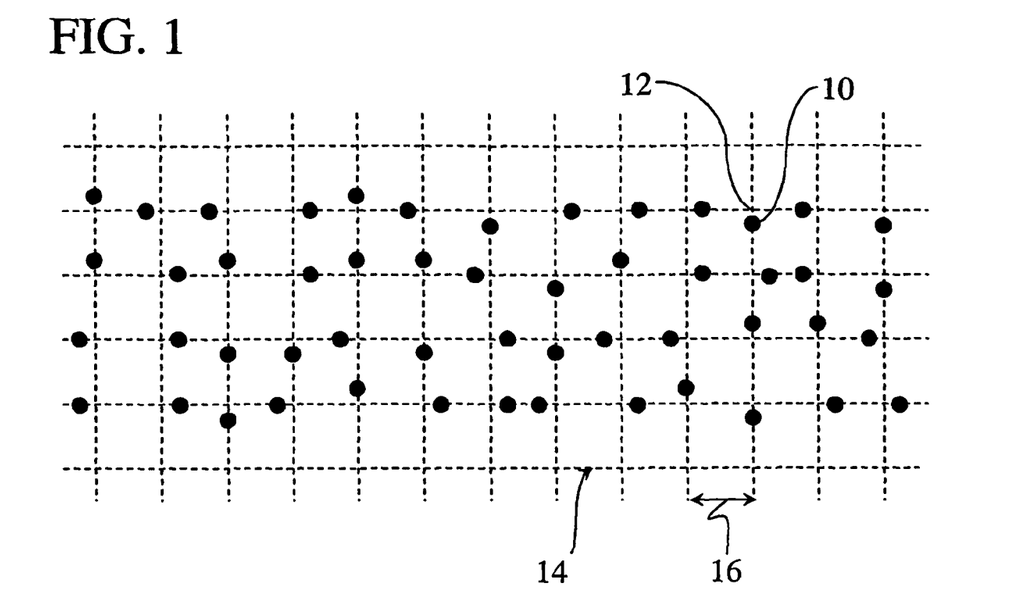
FIG. 1 is a view of a first prior art coding pattern.

FIG. 1 illustrates a part of an absolute position-coding pattern, which will be used to exemplify the invention. The position-coding pattern is detailed in Applicant's International Patent Publications WO 01/26032 and WO 03/001440, which are incorporated herein by this reference. Principally, the coding pattern of FIG. 1 is made up of simple graphical symbols, which can assume four different values and thus are capable of coding two bits of information. Each symbol consists of a mark 10 and a spatial reference point or nominal position 12, the mark 10 being displaced or offset a distance in one of four different directions from the nominal position 12. The value of each symbol is given by the direction of displacement. The symbols are arranged with the nominal positions 12 forming a regular raster or grid 14 which may be virtual and thus not explicitly included in the coding pattern.

In the following, it is assumed that coding pattern of FIG. 1 is used to code absolute positions in two dimensions.

The coding pattern of FIG. 1 can be reproduced on a base with high information density. The grid spacing (as indicated by 16 in FIG. 1) may typically be 0.3 mm, which translates to more than 400,000 symbols on a 25 cm high by 15 cm wide page. Evidently, it might be difficult to print such a high-density coding pattern on a regular digital printer at a reasonable speed.

Figure 2A:
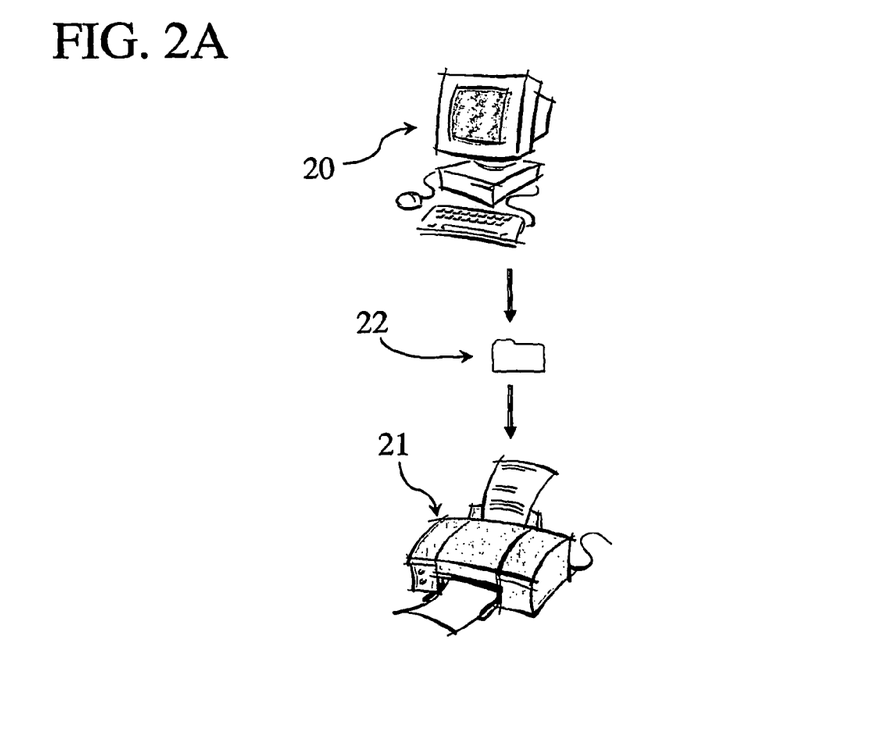
FIG. 2A is a schematic view of a system implementing a printing method according to the invention.

A system for printing such a high-density coding pattern is shown in FIG. 2A. The system includes a computer 20 and a printer 21. The printer 21 may be communicatively connected to the computer 20, so that a page-describing file 22 can be transferred from the computer 20 to the printer 21.

Figure 2B:
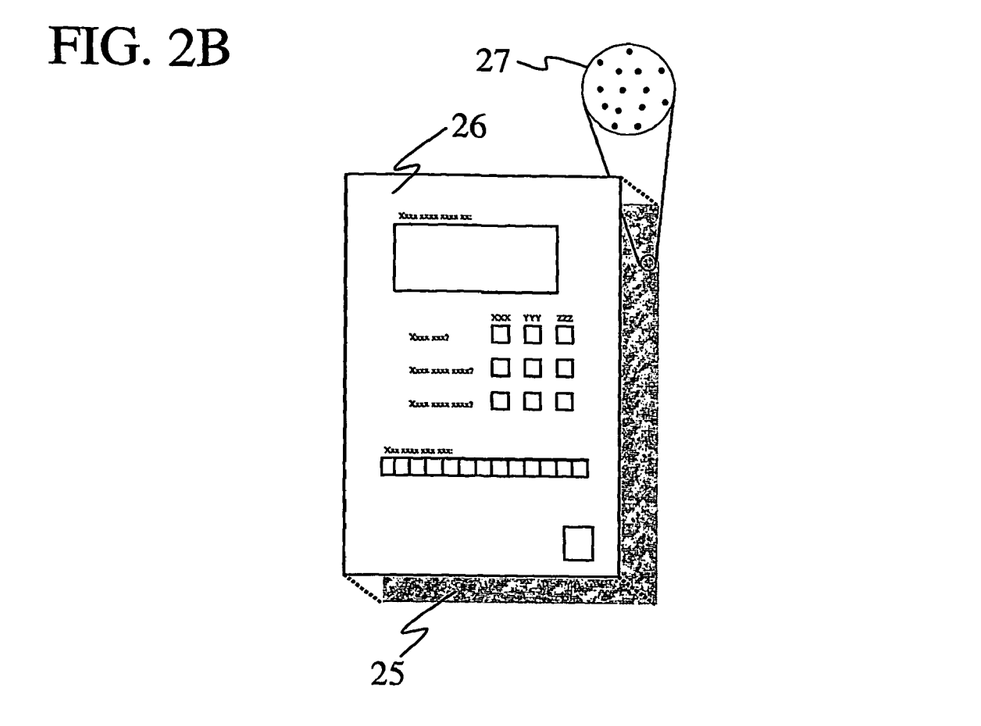
FIG. 2B is a schematic view of a base with an information layer and a coding layer.

The computer 20 has access to a digital representation of the coding pattern which is to be applied as a machine-readable coding layer on a base, for example a sheet of paper. The computer system may also have access to a digital representation of graphical data which is to be printed as a human-readable information layer on the same base. The graphical data may include text, drawings, rulings, images, etc, typically to guide or inform the user of the coded base. FIG. 2B illustrates a combination of such a coding layer 25 and information layer 26, including an enlarged view of the coding pattern 27. As will be further described below, the computer 20 is capable of generating a page-describing code of the coding layer 25 and the information layer 26, if present. The following examples assume that the page-describing code is text-based and written in the widely adopted Post-Script (trademark) programming language, although other types of formats and programming languages are certainly conceivable, for example PCL (Printer Control Language).

The printer 21 receives the file 22, reads the page-describing code therein and converts it to adequate printing instructions. Most commercially available printers have such capability. The operating principle of the printer can be based on any technology that produces either monochrome or polychrome printouts, including but not limited to ink jet, laser, dye-sublimation, solid ink, thermal wax, thermal autochrome, and dot matrix technology.

Prior to describing the inventive principles for controlling the printer, it may be beneficial to give a brief presentation of the encoding principles of the coding pattern of FIG. 1. For reasons of simplification, the principles are first explained in a first dimension, which in this example is in the x-direction (cf. FIG. 3). A cyclic main number sequence is used for the coding in this direction, which cyclic main number sequence has the property that the place in the cyclic main number sequence of each partial sequence of a predetermined length is unambiguously determined. In this example, the predetermined length is 6. Thus if six consecutive numbers are taken from any place in the cyclic main number sequence, then these six numbers will only occur once in the main number sequence in this order. The property also applies if the end of the main number sequence is connected to the beginning of the main number sequence. The main number sequence is therefore called cyclic. In this example, a binary main number sequence is used. If the place of a partial sequence with six numbers is to be unambiguously determined, the main number sequence can thus have a maximal length of $2^6=64$ and the partial sequences of length 6 can have the places 0-63 in the main number sequence. For reasons of error correction, however, a main number sequence of length 63 may be selected.

In the following, it is thus assumed that the length of the main number sequence is 63 and that it thus defines unique places in the range 0-62.

The coding pattern is based on utilizing different rotations or circular shifts of the cyclic main number sequence. In order to code positions in the x-direction, the main number sequence is printed out or arranged in some other way, rotated or circularly shifted in various ways, in columns across the surface, that is in the y-direction orthogonal to the direction in which positions are to be coded. The main number sequence can be printed out repeatedly in the same column, which is required if more positions are to be coded in the y-direction than what corresponds to the length of the main number sequence. The same rotation of the main number sequence is then used for all the repetitions. However, different rotations can be used in different columns.

Figure 3:
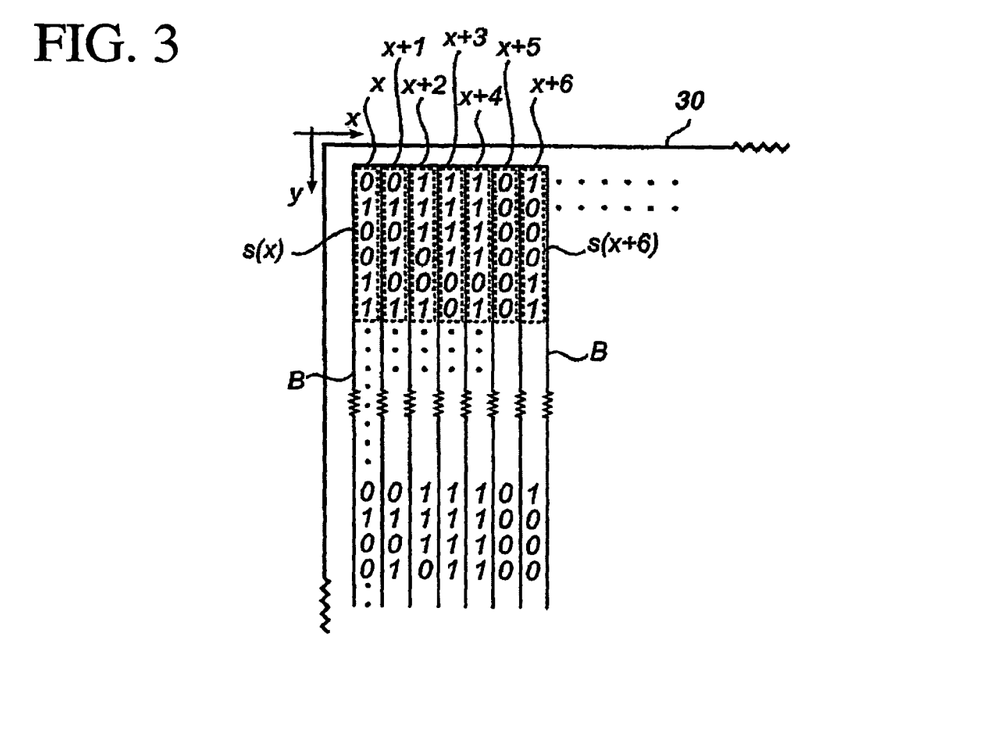
FIG. 3 is a schematic illustration of the underlying coding principles for the pattern in FIG. 1.

FIG. 3 shows schematically a sheet of paper with seven columns x-x+6. Only the first numbers in the different rotations of the main number sequences are illustrated explicitly. A whole main number sequence is marked schematically by a box B. In addition, in FIG. 3 the first partial sequence S of six numbers is marked in each column by a box drawn with broken lines. As mentioned above, each of the partial sequences S has an unambiguously determined place in the main number sequence.

Each pair of adjacent columns defines a difference number d. The difference number d is given by the difference between the places in the main number sequence of the first partial sequence in the respective columns. If instead the difference is taken between the places of the partial sequences one step down in the columns, the result will be the same since the places are displaced in the same way. The difference number d will thus be the same, irrespective of at what "height" in the columns the places of the partial sequences in the main number sequence are compared. For each pair of columns the difference number d is thus constant in the y-direction.

The first partial sequence of the main number sequence in the column x+5 is 0,0,0,0,0,0, which corresponds to place 0 in the main number sequence. The first partial sequence of the main number sequence in column x+6 is 1,0,0,0,1,1, which corresponds to place 57 in the main number sequence. The difference or the circular shift between these columns is thus 57, so d(x+5)=57. It should be pointed out that the difference numbers are determined modulo the length of the main number sequence.

The difference numbers that can be coded in this way are in the range 0-K-1, where K is the length of the main number sequence which in this case is K=63 and with which it is thus possible to code difference numbers in the range 0-62. By selecting different rotations of the main number sequence, it is possible to create a sequence of difference numbers, in the following called a primary number sequence or primary difference number sequence, which has the property that each partial sequence of a predetermined length has an unambiguously determined place in the primary number sequence. In this example, the predetermined length is 5. As each partial sequence consisting of five difference numbers has an unambiguously determined place in the primary difference number sequence, this can be used to code positions in the x-direction. In FIG. 3, the partial sequences S(x)-S(x+5) will thus code five difference numbers d(x)-d(x+4) which give a partial sequence of the primary number sequence.

The columns of the main number sequence's binary numbers form a matrix, which in the following will be called the x-matrix.

The position coding in a second dimension, for example in the y-direction in this case, can be carried out in accordance with the same principle as the position coding in the first dimension. The main number sequence is then arranged with different circular shifts in rows on the surface, that is in the x-direction in FIG. 3. Difference numbers are defined between adjacent rows and these difference numbers form a primary difference number sequence. It is possible to use another main number sequence and another primary difference number sequence in the second dimension. The bases in the various number sequences can also be other than those that are used for the coding in the first dimension. In this example, however, the same sequences are used in both the x-direction and the y-direction. In a corresponding way to the coding in the x-direction, the coding in the y-direction results in a matrix in which the values of the rows consist of the binary values of the main number sequence.

Figure 4A:
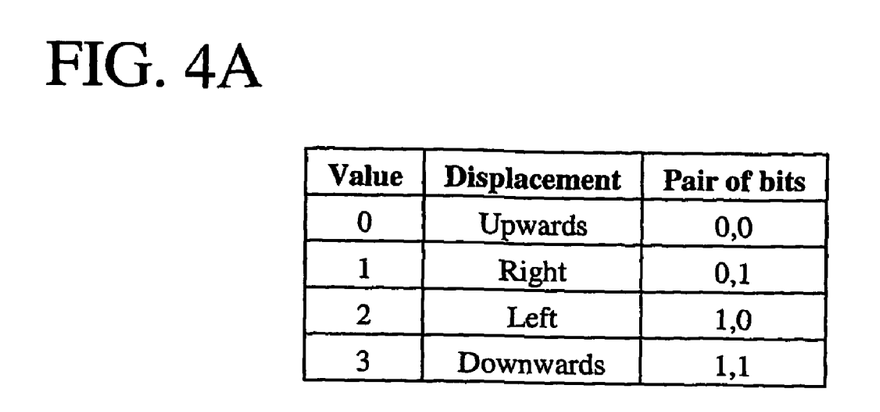
FIG. 4A is a view of a symbol definition for the pattern of FIG. 1.

If the x- and y-matrices are superimposed, for each point in the resulting xy-matrix there will be one bit from the x-matrix and one bit from the y-matrix. At each point the following four bit combinations can thus be obtained: 0,0; 0,1; 1,0; and 1,1. These different combinations can be coded graphically on a surface, for example in the way shown in FIG. 1. The coding that is used in this example is shown in FIG. 4A.

It should be realized that this coding pattern can be reversibly separated into two coding dimensions, i.e. one x-coding dimension and one y-coding dimension. Each such coding dimension is basically formed by a maximum of 63 different code blocks, in form of the 63 different rotations of the 63-bit long main number sequence. Thus, each coding dimension can be represented by only a few code blocks. For example, the 400,000+ symbols on the above-mentioned 25 cm high by 15 cm wide page, may be represented by two coding dimensions with approximately 212 code blocks each.

However, the representation may be made still more compact, based on the fact that all rotations are partially identical. Thus, a coding dimension may be represented by only one code block, corresponding to the main number sequence, which is physically displaced or shifted between the different rows/columns to simulate the relevant rotations.

Such a compact representation of the coding pattern may be advantageously used to transfer the coding pattern to a printer, provided that the compact representations of the coding dimensions can be reunited in the printer to form a printable image of the coding pattern.

Figure 4B:
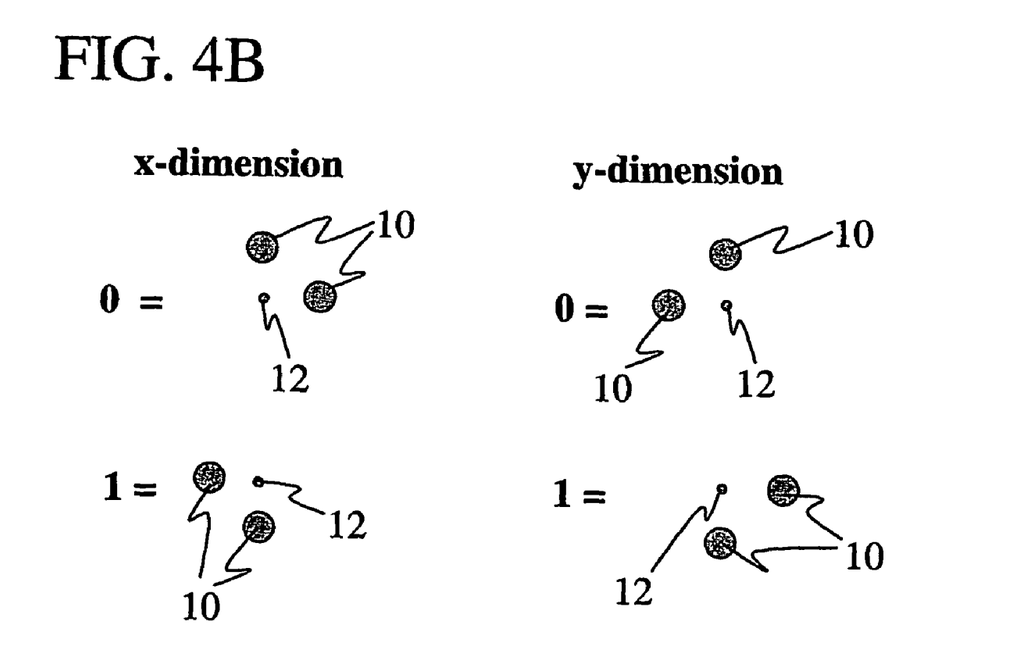
FIG. 4B is a view of a set of superimposed symbols for the coding pattern of FIG. 1.

This may be achieved by forming the code block as one or more bitmap images of a corresponding sequence of symbols. More specifically, each bit value in the code block is represented by a superposition of all associated symbols, i.e. all symbols that code this bit value. Thus, a set of mutually unique superimposed symbols is created from the original set of mutually unique symbols. FIG. 4B illustrates such superimposed symbols for the bit values 0 and 1 in the x- and y-dimensions, respectively.

Figure 4C:
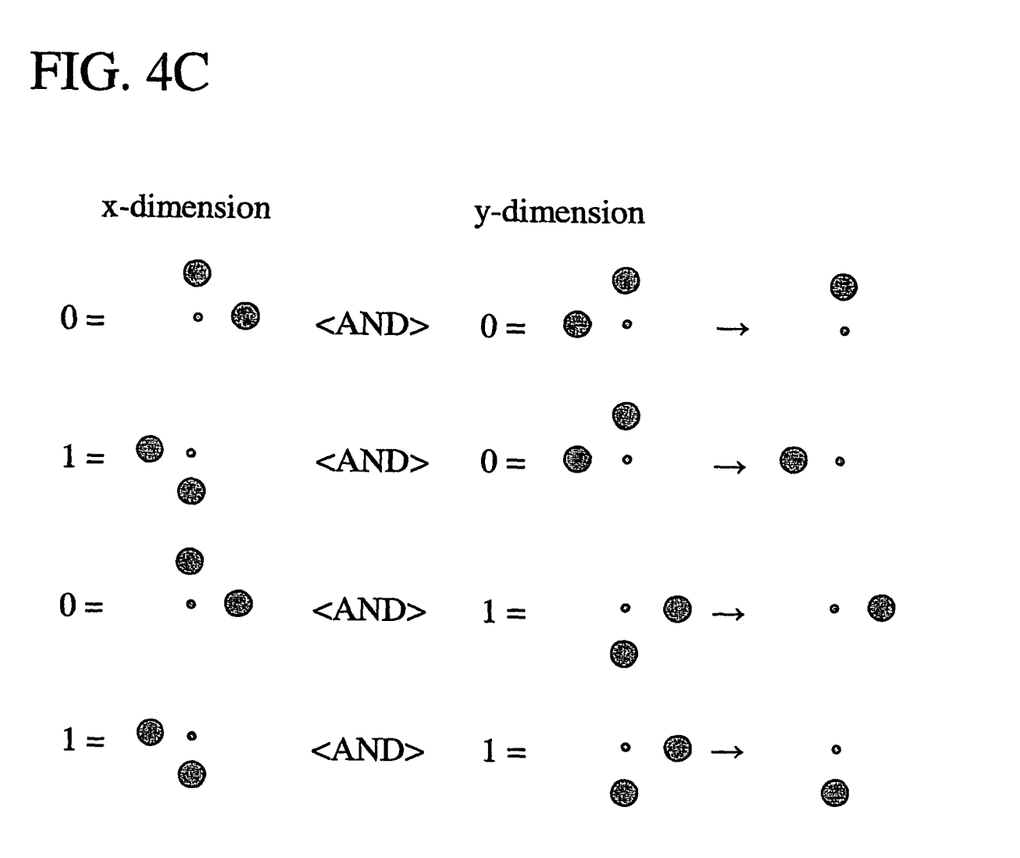
FIG. 4C is a schematic illustration of different logical combinations of the superimposed symbols in FIG. 4B.
Figures 4D, 4E:
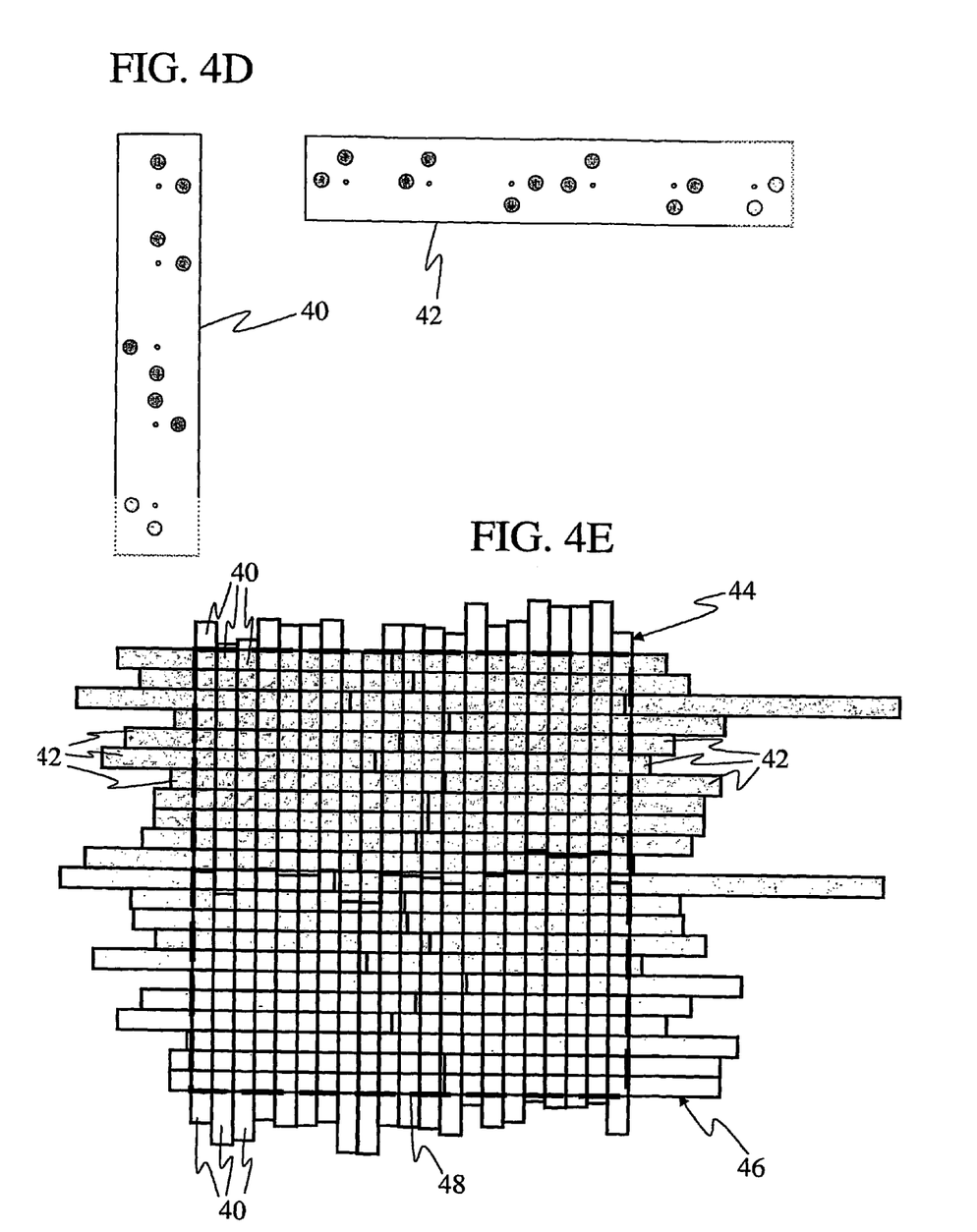
FIG. 4D is a schematic illustration of code block images for the coding pattern in FIG. 1.
FIG. 4E is a schematic illustration of two mutually aligned composite images that are formed from the code block images of FIG. 4D.

By representing each coding dimension with such superimposed symbols, the coding dimensions can be combined to form a printable image. Suitably, the coding dimensions are mutually aligned with respect to the spatial reference points of their respective symbols, whereupon a simple AND logic operation is effected on the coding dimensions, image element by image element. This principle is illustrated in FIG. 4C for the superimposed symbols of FIG. 4B. FIG. 4D gives two exemplary code block images (bitmaps) 40, 42 with such superimposed symbols which may be used to represent the main number sequence in the x-coding dimension and the y-coding dimension, respectively.

The reconstruction of the coding pattern is illustrated in FIG. 4E, where a first composite image 44 of the x-coding dimension is formed by arranging the code block images 40 in columns with a given mutual shift or phase difference, and a second composite image 46 of the y-coding dimension is formed by arranging the code block images 42 in rows with a given mutual shift or phase difference. After the AND operation between the composite images 44, 46, the coding pattern is reconstructed as a bitmap image in the area indicated by the dashed rectangle 48.

It should be mentioned that the AND logic operation may be implemented in alternative ways. For example, the AND operation may be inherent in the process of combining the code block images of the x and y dimensions. In such an embodiment, one of the code block images may be embodied as a clipping region definition, in which each of the superimposed symbols is represented by one or more so-called clipping regions. A clipping region operates on an image to retain all image data within a defined region and to discard the rest. Thus, when the code block images of the x and y dimensions are combined, the clipping regions of one dimension operates on the image elements of the other dimension to retain the image elements included in the clipping regions, thereby simulating the above AND logic operation. For example, in FIG. 4D, the marks of the code block image 40 or 42 may be implemented as individual mark-shaped clipping regions. The skilled person should readily realize other suitable layouts of such clipping regions.

It should be noted that the spatial reference points 12, which are visualized in FIGS. 4B-4D, may be virtual and, thus, not visible in the graphical symbols.

Figure 5:
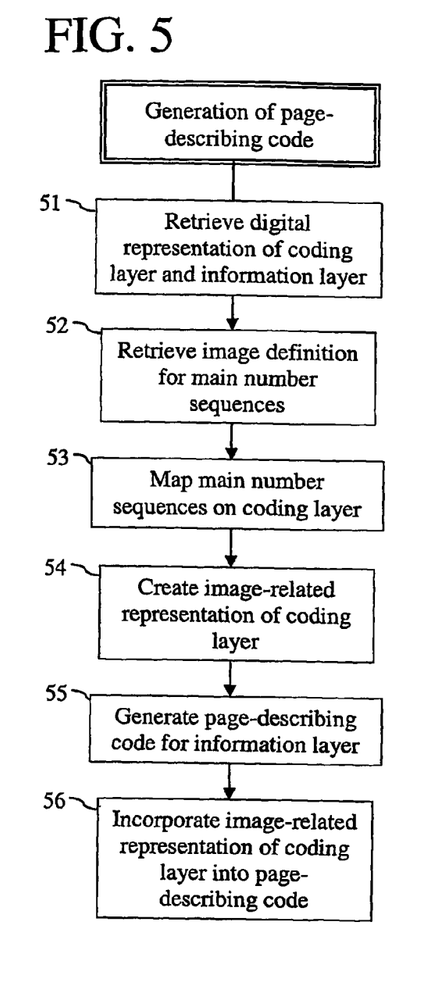
FIG. 5 is a flow chart of a method for generating a page-describing code according to the invention.

As already mentioned, the page-describing file 22 in FIG. 2A can be generated based on the above principles. FIG. 5 illustrates some principal steps that may be executed in the computer 20 in the generation of such a page-describing file 22.

In step 51, a digital representation of the coding layer is retrieved, suitably from a memory associated with the computer 20. The digital representation of the coding layer may be supplied to the computer 20 in pre-generated form, or be generated by the computer 20 on demand. For example, the digital representation may include the above-mentioned symbol values (0-3), with the mutual spatial arrangement between the symbols being retained. Alternatively, the digital representation may be given by the above-mentioned x- and y-matrices. Similarly, step 51 may include retrieval of a digital representation of the information layer to be printed.

Step 52 includes retrieving an image definition for each main number sequence used in the coding pattern. This image definition is suitably pre-defined, and may later be transferred to the printer together with the page-describing code. Alternatively, it may be resident in a non-volatile memory in the printer.

In step 53, the digital representation of the coding layer is parsed based on the main number sequences. More specifically, the main number sequences are mapped against the digital representation to identify the shift between adjacent columns and rows in the x-coding dimension and the y-coding dimension, respectively. In this mapping operation, the main number sequences are suitably represented in the same format as the digital representation, for example as a sequence of symbol values (0-3) or bit values (0-1).

In step 54, a compact representation of the coding pattern is created, in which each coding dimension is represented by the number of code block images per column/row and the shift or relative phase difference between adjacent columns/rows. The compact representation reduces both transfer and processing times for the resulting page-describing file.

In step 55, a page-describing code is generated for the information layer (cf. FIG. 2B). This step may be implemented according to prior art technique, known to the person skilled in the art.

In step 56, the compact representation of the coding pattern is incorporated into the page-describing code, to generate the final page-describing file for the information layer and the coding layer.

Steps 55 and 56 may alternatively be executed before or concurrent with the generation of the image-related representation (steps 53-54). Further, step 56 may be executed before or concurrent with step 55. Still further, step 55 may be excluded altogether, in the absence of any information layer.

It should also be noted that step 53 may be excluded, for example if the retrieved digital representation already identifies the mutual shifts of the main number sequence in each dimension.

The above generation of the page-describing code is suitably carried out in the computer 20 under control of a computer program, which may be embodied on a record medium, stored in a computer memory, embodied in a read-only memory or carried on an electrical carrier signal.

The final page-describing file may be generated in the widely-adopted text-based PostScript programming language. A schematic example of such a PostScript file for generating a coding pattern, 25 cm high by 15 cm wide, is given below in pseudo-code.

```
% define image of x-dimension main number sequence symbols
drawvertical : code...
% define image of y-dimension main number sequence symbols
drawhorisontal : code...
% define overall clipping region (visible part of the generated pattern)
code...
% push x-dimension shifts to stack
0 4 23 53 23 12 34 53 23 12 ...
% generate composite image of x-coding dimension
1 1 1485
{
    pop                 % remove counter
    gsave
        0 exch moveto   % take first shift and move to correct position
                        (x-shift), swap top values on stack
        drawvertical    % repeat this line as many times as needed to
                        fill a vertical column of the paper
    grestore
    1 0 rmoveto         % move to next column
} for
% push y-dimension shifts to stack
0 4 23 53 23 12 34 53 23 12 ...
% generate composite image of y-coding dimension
1 1 2475
{
    pop                 % remove counter
    gsave
        0 moveto        % take first shift and move to correct position
        drawhorisontal  % repeat this line as many times as needed to
                        fill a horisontal row of the paper
    grestore
    0 1 rmoveto         % move to next line
} for
% apply AND operation to composite images
code...
% apply clipping region
code...
showpage
```

In the above Postscript code, the coding dimensions are represented by a set of function/program definitions and a set of function/program calls. The function/program definitions may generate the code block images of the superimposed code symbols, and the function/program calls may be represented in the form of a unique identifier, given by one or more characters.

As an alternative, a font may be defined and used to represent the main number sequences in the page-describing file, via a respective font character. For example, font character (A) may be defined to generate the code block image 40 in FIG. 4D, font character (B) may be defined to generate the code block image 42 in FIG. 4D. Thus, the font characters will replace the above function/program calls. The font may be defined either as a bitmap font or an outline font. In a bitmap font, each character is represented as a fixed-size pixel image. In an outline font, each character is scaleable in size and represented by a mathematical expression.

The font-based approach may have a number of general advantages. The font character representation is compact and may be used to reduce the number of code instructions. Further, digital printers are generally optimized for handling fonts, and may even have a dedicated cache memory for font definitions. Still further, since font characters have a predefined size (bitmap fonts) or a settable size (outline fonts), consecutive characters may be automatically aligned by the printer without a need for an explicit reset instruction. This may also contribute to increasing the processing speed in the printer.

It is to be understood an actual page-describing file may include further elements (overhead), such as a definition of basic properties of the coding pattern (e.g. grid spacing, mark size, mark offset), a font character definition, a printer instruction to build a customized font in a font dictionary, a printer instruction to retrieve and scale the customized font and to set this font as the current font, etc. The actual page-describing file may also include page-describing code for any graphical data to be printed together with the coding pattern.

Returning to the example of a 25 cm high by 15 cm wide page, a conventional PostScript code would exceed 800,000 bytes, whereas the above printing methodology would result in a PostScript file size of approximately 20,000 bytes (including about 10,000 bytes overhead). The small file size provides ease of distribution. For example, the PostScript file may be included in an email to a receiving party which may send the file to a printer. Optionally, an application at the receiving party may be operable to generate PostScript code for the email message, or any other selected graphical object, and to incorporate this as an information layer in the PostScript file, for subsequent processing in a printer. Thereby, the receiving party can generate encoded substrates at will.

Figure 6:
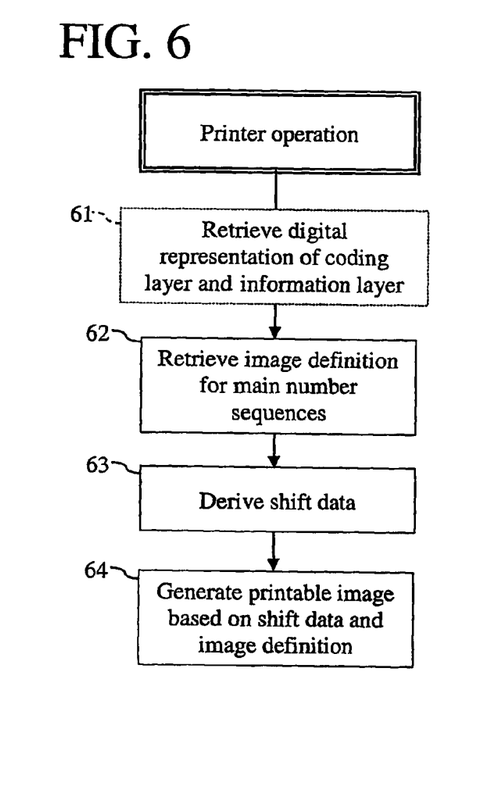
FIG. 6 is a flow chart of a method of operating a printer according to the invention.

FIG. 6 illustrates the process effected in the printer on receipt of the page-describing file. In step 62, the image definition for the main number sequences of the x- and y-dimensions is retrieved from the page-describing file. In step 63, shift data designating the relative phase difference between adjacent columns/rows is retrieved from the page-describing file. In step 64, a printable image is generated based on the shift data and the code block images given by the image definition. Suitably, the code block images are arranged and merged according to the shift data to form the above-mentioned composite images, which then are combined via the AND logic operation to form the printable image.

In another embodiment, the printer operation is not entirely controlled by the programming instructions of page-describing file. Instead, the printer has a dedicated pattern generation module, which is implemented by software and/or hardware to generate the coding pattern. On receipt of a request for print-out of a coding pattern, the module retrieves a digital representation of the coding pattern (illustrated as optional step 61 in FIG. 6), retrieves the image definition of the relevant main number sequences, identifies the relevant rotations and shifts in the digital representation, and generates the printable image based on the shifts and the code block images given by the image definition. The request for print-out may include the digital representation, for example in the form of the above-mentioned symbol values or bit values. Alternatively, as described in Applicant's international patent application WO 02/082366, the request may include-only information describing the boundaries of the absolute positions to be coded on the base, whereupon the module is capable of retrieving the relevant digital representation.

Figure 7:
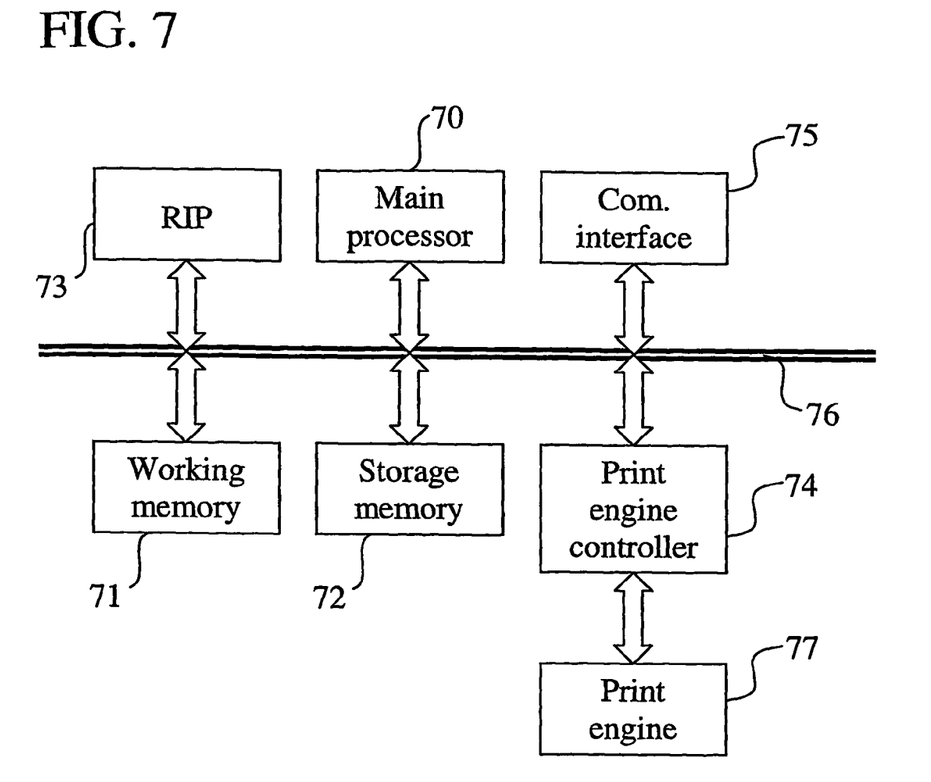
FIG. 7 is a schematic block diagram of an electronic circuitry part in the printer shown in FIG. 2A.

For the sake of completeness, FIG. 7 illustrates some main components of a conventional digital printer that may be used to print a coding pattern according to the invention. Such a digital printer may include a main processor 70 (e.g. CPU, microprocessor), a working memory 71 (e.g. RAM), a storage memory 72 (non-volatile memory, e.g. ROM, PROM, EEPROM, flash), a raster image processor (RIP) 73, a print engine controller 74, and a communications interface 75 (e.g. USB, Firewire, IrDA, Bluetooth, Ethernet, parallel port, modem) which are interconnected over a bus structure 76. The storage memory 72 holds the software for the main processor 70 and the RIP 73, as well as configuration data including any resident fonts. When the main processor 70 receives the page-describing file via the communications interface 75, it operates the RIP 73 to convert the page-describing code into a rasterized image, which is stored in the working memory 71. Optionally, the page-describing file may be processed to generate the coding layer and the information layer in two separate images. The print engine controller 74 is then operated to retrieve the rasterized image(s) from the working memory 71 and control a print engine 77 to generate a hardcopy of the rasterized image(s). Further, the printer may be provided with the above-mentioned pattern generation unit, implemented as a hardware unit connected to the bus structure 76, as a software unit stored in the storage memory 72, or as a combination thereof.

There are many variations that may be made consistent with the present invention. The foregoing description is presented for purposes of illustration and description. It is not exhaustive and does not limit the invention to the precise form disclosed. Modifications and variations are possible in light of the above teachings or may be acquired from practicing the invention.

For example, the above coding pattern encodes absolute positions, via a first coordinate in the x-dimension and a second coordinate in the y-dimension. In one alternative, one or both dimensions encodes other data than position data, for example as disclosed in Applicant's International Patent Publication No. WO 01/71653. It should also be stated that the main number sequences may run in the same direction in the two dimensions, instead of being mutually orthogonal as in the above example.

Figure 8A:
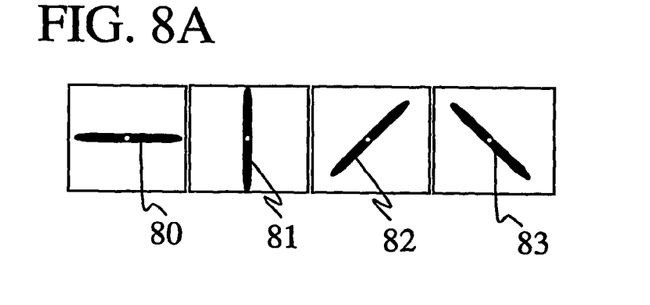
FIGS. 8A and 8B are views of a set of code symbols and superimposed code symbols, respectively, representing a second prior art coding pattern.
Figure 8B:
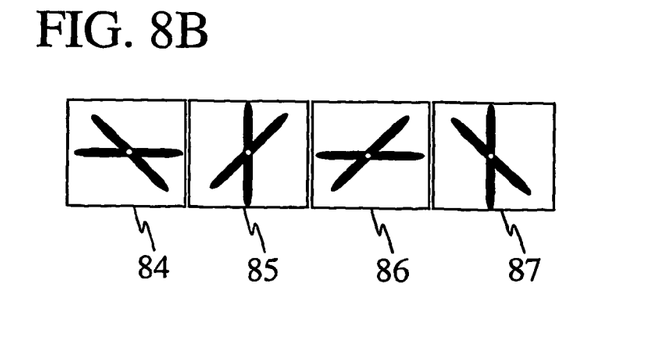

Further, it should be noted that the above methodology is not in any way restricted to the illustrated graphical expression of the symbols. FIG. 8A illustrates another exemplifying set of graphical symbols 80-83. The symbols assume four different values, given by the shape of the symbol, and thus are capable of coding two bits of information, with one bit coding a first dimension and another bit coding a second dimension. FIG. 8B illustrates a corresponding set of superimposed symbols 84-87.

Figure 9A:
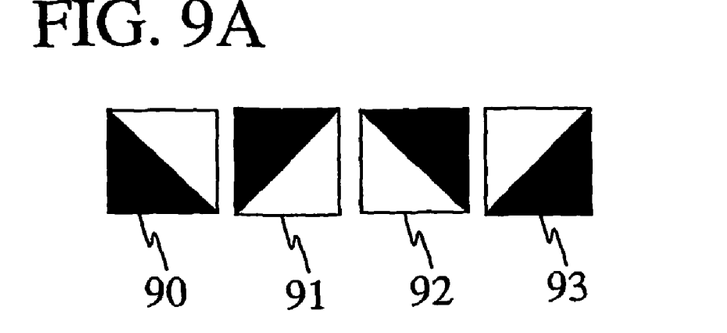
FIGS. 9A and 9B are views of a set of code symbols and superimposed code symbols, respectively, representing a third prior art coding pattern.
Figure 9B:
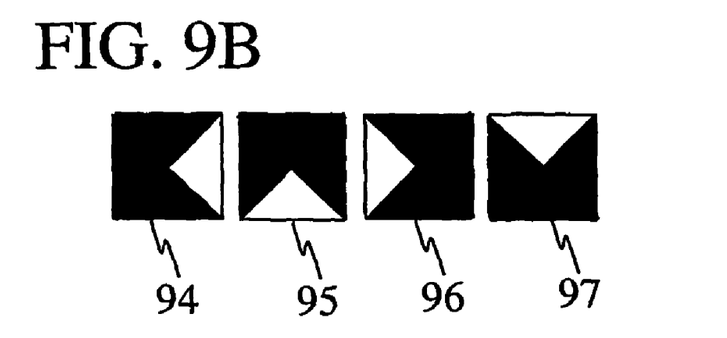

FIG. 9A illustrates a further set of graphical symbols 90-93. The triangular symbols assume four different values, again given by the shape of the symbol. FIG. 9B illustrates a corresponding set of superimposed symbols 94-97.

Figure 10:
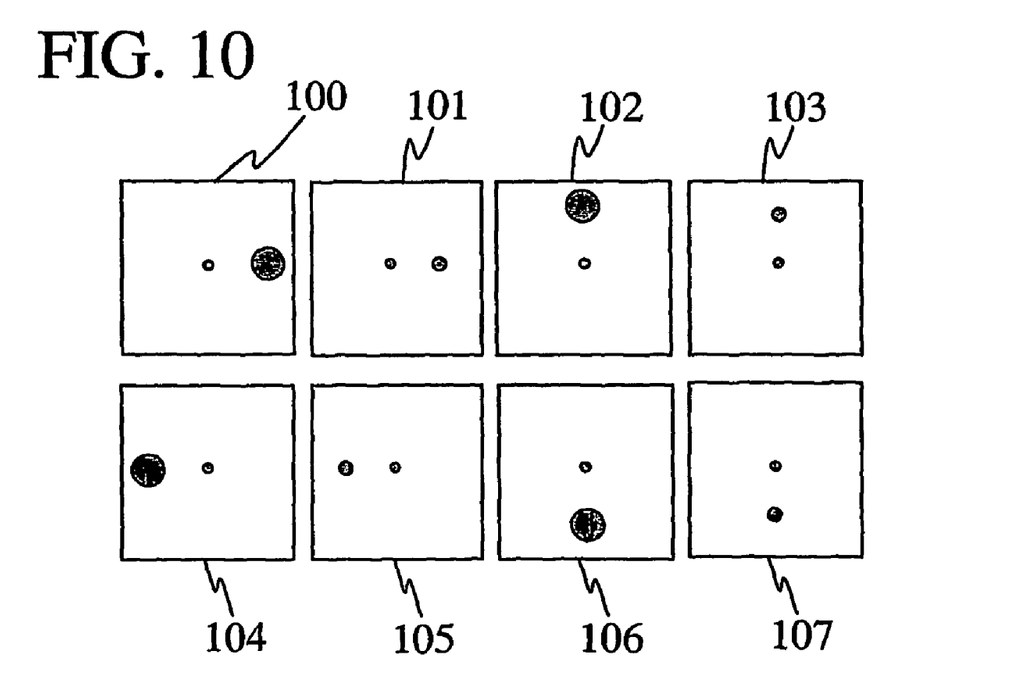
FIG. 10 is a view of a set of code symbols of a fourth prior art coding pattern.

FIG. 10 illustrates yet another alternative coding, in which the graphical symbols 100-107 assume eight different values, given by the combination of the size and the direction of displacement with respect to the spatial reference point. Such a coding pattern may be used to code data in four separable dimensions (with two different number values per dimension) or two separable dimensions (with four different number values per dimension). The skilled person should readily realize ways to implement the set of superimposed symbols for use in the printing of this coding pattern in line with the previous examples.

The above coding patterns are only given for purposes of illustration. In these as well as other relevant coding patterns, the symbols may have a finite number of predetermined, discriminable graphical states, each such state yielding a coding value of the symbol. The graphical states may be represented by a magnitude of displacement of a code mark with respect to an associated spatial reference point, a direction of displacement of a code mark with respect to an associated spatial reference point, a shape of a code mark, a size (diameter, surface area, etc) of a code mark, a color (hue, greyscale, texture, etc) of a code mark, or any combination thereof.

It should also be stated that any suitable representation of the main number sequence(s) can be used in the page-describing code. For example, instead of being represented as one or more code block images, each main number sequence may be represented as a sequence of number identifiers, e.g. the actual bit values of the number sequence or a derivative thereof. In this case, the operation for combining such values from different dimensions may be defined to the printer based upon a lookup table, similar to the definition of FIG. 4A, in which a certain combination of values results in a given output that either constitutes or identifies the corresponding symbol. Alternatively or additionally, the combination operation may defined to the printer as an arithmetic combination of values. Returning to the coding example of FIG. 4A, corresponding bit values for the x and y dimensions may, for example, be combined into a correct symbol value by first multiplying the bit value of the x dimension by two and then adding it to the bit value of the y dimension. Data defining the combination operation, be it based on table lookup or arithmetic calculations, may be included in the page-describing code or be pre-stored in the printer's non-volatile memory. The printer may be controlled to build a printable image of the coding layer, based upon the output of the combination operation. In this process, each unique symbol or unique groups of symbols with a given mutual spatial arrangement, may be represented by a font character given by a font definition. The font definition may be included in the page-describing code or be pre-stored in the printer's non-volatile memory. The use of fonts to represent symbols or groups of symbols is further described in Applicant's International Patent Application No. PCT/SE2004/000805, which is incorporated herein by reference.

This alternative embodiment, involving identifier-based definitions instead of image definitions in the page-describing code, may benefit from putting less load on the printer's processor, since the number of necessary combination operations are reduced, although at the cost of an increase in the size of the page-describing code, and possibly an increase in the demand for accessible working memory in the printer.

It should perhaps also be emphasized that the printing methodology of the present invention is useful in the printing of coding patterns without separation thereof in two or more dimensions, for reasons of either choice or necessity. The coding pattern may still be compactly represented by the main number sequence(s) of the pattern, and the predefined shifts.

Still further, it should be noted that each dimension could include more than one main number sequence. For example, one or more main number sequences could encode data, whereas one or more main number sequences could provide for synchronization during decoding of the pattern. Examples of such synchronization codes are, i.a., found in aforesaid U.S. Pat. No. 6,000,621.

In another embodiment, the page-describing code includes additional instructions to modify the graphical symbols in an intermediary image before generating the final printable image. This may be done to selectively overlay further data on the graphical symbols. Examples of coding patterns with such overlaid data are given in Applicant's publications US 2003/0066896 and WO 01/71643. The aforesaid additional instructions may comprise changing the color, size or shape of selected graphical symbols according to a given formatting rule. For example the size or shape may be modified by operating a predefined mask on the intermediary image.

It may also be noted that some aspects of the invention may be applicable also to coding patterns based on repeating number sequences that are not cyclic.

The invention claimed is:

1. A method of printing a coding pattern to code data in a first dimension on a surface, the coding pattern comprising a plurality of first parallel number sequences which represent different rotations of a first cyclic number sequence, said method comprising:
    retrieving a digital representation of the coding pattern;
    identifying said rotations in said digital representation to derive first shift information which designates a phase difference between each rotation and the first cyclic number sequence;
    generating a first data structure in which each of said rotations is represented by said first shift information and first definition data, said first definition data including a first image definition that represents said first cyclic number sequence using at least one code block image;
    transferring the first data structure to a printer; and
    enabling the printer to convert the first data structure into a printable image.

2. A method of claim 1, wherein each number value in said first cyclic number sequence is represented in said at least one code block image by at least one code symbol, said enabling comprising:
    enabling the printer to retrieve, for each rotation as represented in the first data structure, said at least one code block image, and to merge the thus-retrieved code block images, based upon said first shift information, to form a first composite image.

3. A method of claim 1, wherein the coding pattern is printed to also code data in a second dimension on said surface, the coding pattern comprising a plurality of second parallel number sequences which represent different rotations of a second cyclic number sequence, said method comprising:
    identifying said rotations of the second cyclic number sequence in said digital representation to derive second shift information which designates a phase difference between each such rotation and the second cyclic number sequence;
    generating a second data structure in which each of said rotations is represented by said second shift information and second definition data which represents said second cyclic number sequence;
    transferring the second data structure to the printer; and
    enabling the printer to convert the first and second data structures into a printable image.

4. A method of claim 3, wherein said second definition data comprises a second image definition which represents said second cyclic number sequence by at least one code block image.

5. A method of claim 4, wherein each number value in said second cyclic number sequence is represented in said at least one code block image by at least one code symbol, said enabling comprising:
    enabling the printer to retrieve, for each rotation as represented in the second data structure, said at least one code block image, and to merge the thus-retrieved code block images to form a second composite image.

6. A method of claim 5, wherein the enabling comprises enabling the printer to combine said first and second composite images.

7. A method of claim 5, wherein each code symbol codes one number value in the first cyclic number sequence and one number value in the second cyclic number sequence, said enabling comprising:
    in each code block image, representing each number in the first and second cyclic number sequences, respectively, by a graphic superposition of all code symbols that code the value of said number.

8. A method of claim 3, wherein the first and second cyclic number sequences are identical.

9. A method of claim 7, wherein said enabling comprises:
    enabling said printer to align said first and second composite images, determine the AND logic values of mutually aligned image elements in said first and second composite images to obtain a two-dimensional matrix of AND logic values, and form said printable image from said two-dimensional matrix.

10. A method of claim 9, wherein each code symbol comprises a code mark and an associated spatial reference point; and further wherein said enabling said printer to align comprises enabling said printer to align said spatial reference points.

11. A method of claim 3, wherein
    said first and second definition data comprises first and second data items that each represent one number value in said first and second number sequences, respectively; said enabling comprising:
    enabling said printer to combine, according to a given combination operation, a first data item in said first definition data with a spatially corresponding data item of said second definition data.

12. A method of claim 11, wherein each of the data items defines an image of at least one code symbol that represents said one number value.

13. A method of claim 11, wherein each of the data items comprises an identifier of said one number value.

14. A method of claim 5, wherein each unique combination of a number value in the first cyclic number sequence and a number value in the second cyclic number sequence is represented by a predetermined, discriminable graphical state of said code symbol.

15. A method of claim 14, wherein each code symbol comprises a code mark and an associated spatial reference point, wherein said states are represented by characteristics selected from the group consisting of:
    a magnitude of displacement of said code mark with respect to its associated spatial reference point;
    a direction of displacement of said code mark with respect to its associated spatial reference point;

a shape of said code mark;
a size of said code mark;
a color of said code mark;
and any combination thereof.

16. A method of claim 1, wherein at least one of said first and second dimensions code at least one absolute position.

17. A method of claim 1, wherein said first and second dimensions code at least one absolute position.

18. A method of claim 17, wherein said first and second dimensions code absolute positions in a two-dimensional coordinate system.

19. A method of claim 1, wherein said enabling includes transferring a page-describing code to said printer for execution therein.

20. A method of claim 19, wherein said generating includes incorporating said data structure in the page-describing code.

21. A method of claim 1, wherein said image definition is a font definition.

22. A method of claim 21, wherein said font definition defines a bitmap font.

23. A computer readable medium comprising instructions for causing a computer to perform the method according to claim 1.

24. A computer readable medium of claim 23, wherein the medium includes a computer memory or a read-only memory.

25. An apparatus for printing a coding pattern to code data in a first dimension on a surface, the coding pattern comprising a plurality of first parallel number sequences which represent different rotations of a first cyclic number sequence, said apparatus comprising:
a processor which retrieves a digital representation of the coding pattern;
a first module, associated with the processor, which identifies said rotations in said digital representation to derive first shift information which designates a phase difference between each rotation and the first cyclic number sequence;
a second module, associated with the processor, which generates a first data structure in which each of said rotations is represented by said first shift information and first definition data, said first definition data including a first image definition that represents said first cyclic number sequence using at least one code block image; and
a communications interface, functionally coupled to the processor, for transferring the first data structure to a printer, said printer being enabled to convert the first data structure into a printable image.

26. A method, in a printer, for printing a coding pattern to code data on a surface, the coding pattern comprising a plurality of parallel number sequences which represent different rotations of a cyclic number sequence, said method comprising:
deriving shift information which designates a phase difference between each rotation and the cyclic number sequence;
retrieving definition data including a first image definition that represents said cyclic number sequence using at least one code block image; and
generating a printable image of said coding pattern based on said shift information and said definition data.

27. A method of claim 26, wherein said definition data comprises an image definition which represents said cyclic number sequence by at least one code block image.

28. An apparatus, in a printer, for printing a coding pattern to code data on a surface, the coding pattern comprising a plurality of parallel number sequences which represent different rotations of a cyclic number sequence, said apparatus comprising a pattern generation module which:
derives shift information which designates a phase difference between each rotation and the cyclic number sequence;
retrieves definition data including a first image definition that which represents said cyclic number sequence using at least one code block image; and
generates a printable image of said coding pattern based on said shift information and said definition data.

29. A method, in a printer, for printing a coding pattern to code data in a first dimension and a second dimension on a surface, the first dimension of the coding pattern comprising a plurality of first parallel number sequences, and the second dimension of the coding pattern comprising a plurality of second parallel number sequences, wherein each combination of one number value in the first number sequences and one number value in the second number sequences is represented by a unique code symbol in said coding pattern, said method comprising:
retrieving, for each number sequence in each dimension, at least one code block image of the code symbols that represent the number sequence;
merging the thus-retrieved code block images to form a first and a second composite image corresponding to said first dimension and said second dimension, respectively; and
combining said first and second composite images to form a printable image.

30. A method of claim 29, wherein each code block image represents each individual number of the associated number sequence by a graphic superposition of all code symbols that code the number value of said individual number.

31. A method of claim 30, wherein said combining comprises: aligning said first and second composite images; determining the AND logic values of mutually aligned image elements in said first and second composite images to obtain a two-dimensional matrix of AND logic values; and forming said printable image from said two-dimensional matrix.

32. A method of claim 29, wherein said code block images are included in a font definition.

33. A method of claim 29, which is effected at least partly under control of a page-describing code received by the printer.

34. A method of claim 33, wherein said page-describing code includes an image definition which defines said code block images.

35. A method of claim 29, wherein the first and second number sequences represent different rotations of a first and a second cyclic number sequence, respectively, said method comprising the initial identifying the location of said rotations within the first and second dimensions of the coding pattern.

36. A method of claim 35, further comprising the deriving, for each dimension, shift information which designates a phase difference between each rotation and the cyclic number sequence; wherein said merging comprises, for each dimension: merging a plurality of identical code block images of the code symbols that represent the cyclic number sequence, said identical code block images being arranged with phase differences according to said shift information.

37. An apparatus, in a printer, for printing a coding pattern to code data in a first dimension and a second dimension on a surface, the first dimension of the coding pattern comprising a plurality of first parallel number sequences, and the second dimension of the coding pattern comprising a plurality of second parallel number sequences, wherein each combination of one number value in the first number sequences and one number value in the second number sequences is represented by a unique code symbol in said coding pattern, said apparatus comprising a pattern generation module which:

retrieves, for each number sequence in each dimension, at least one code block image of the code symbols that represent the number sequence;

merges the code block images to form a first and a second composite image corresponding to said first dimension and said second dimension, respectively; and combines said first and second composite images to form a printable image.

* * * * *